United States Patent [19]

Derrick et al.

[11] Patent Number: 4,882,054
[45] Date of Patent: Nov. 21, 1989

[54] VIBRATORY SCREENING MACHINE WITH TILTABLE SCREEN FRAME AND ADJUSTABLE DISCHARGE WEIR

[75] Inventors: William W. Derrick, East Amherst; Robert G. Derrick, Buffalo, both of N.Y.

[73] Assignee: Derrick Manufacturing Corporation, Buffalo, N.Y.

[21] Appl. No.: 235,038

[22] Filed: Aug. 22, 1988

[51] Int. Cl.$^4$ ............................................. B01D 33/00
[52] U.S. Cl. ......................... 210/389; 210/405; 210/433.1; 209/235; 209/255; 209/404
[58] Field of Search ............... 210/388, 389, 390, 405, 210/407, 433.1; 209/235, 255, 260, 402, 404, 413; 162/341, 355

[56] References Cited

U.S. PATENT DOCUMENTS

| | | | |
|---|---|---|---|
| 574,696 | 1/1897 | Whiting | 209/260 |
| 1,154,501 | 9/1915 | Foster | 209/413 |
| 2,329,295 | 9/1943 | Reagan | 210/433.1 |
| 3,864,249 | 2/1975 | Wallis | 210/389 |
| 4,595,499 | 6/1986 | Kormanik et al. | 210/405 |

FOREIGN PATENT DOCUMENTS

226719 1/1960 Australia.

Primary Examiner—Peter Hruskoci
Assistant Examiner—Christopher Upton
Attorney, Agent, or Firm—Joseph P. Gastel

[57] ABSTRACT

A vibratory screening machine having a main frame, a screen frame pivoted at substantially its midpoint on the main frame, a weir which receives a liquid-solid mixture to be screened, a discharge spout on the weir, a linkage interconnecting one end of the screen frame with the discharge spout, and a hand wheel effectively connected to the discharge spout to raise and lower it and thereby simultaneously adjust the inclination of the screen frame while maintaining the drop of the liquid-solid mixture being discharged onto the screen frame substantially constant in all inclined positions of the screen frame.

23 Claims, 7 Drawing Sheets

VIBRATORY SCREENING MACHINE WITH TILTABLE SCREEN FRAME AND ADJUSTABLE DISCHARGE WEIR

BACKGROUND OF THE INVENTION

The present invention relates to an improved vibratory screening machine having a tiltable screen frame and an adjustable discharge weir for discharging a liquid-solid mixture onto the screen frame in differently inclined positions thereof.

By way of background, in the oil well drilling industry, drilling mud is used in the drilling process in the well known manner. However, the drilling mud is expensive and it is therefore screened to remove foreign materials and thus reclaim the mud for reuse. In drilling an oil well, various types of soil conditions are encountered, such as sand, gravel, clay, etc. For the various soils, different inclinations of the screen frame are best to thereby to obtain maximum recovery of the drilling mud. In this respect, with certain soils, it takes longer to separate the drilling mud from the soil, which is subsequently discarded, and thus it is desirable to have an upward tilt on the screening frame to thereby permit a longer contact between the liquid-solid mixture and the screening machine. For other soils it is less difficult to separate the drilling mud from the soil and thus a downwardly inclined tilt of the screen frame is desirable. However, there are certain situations wherein clay, known as "gumbo," is encountered. In a condition of this type, it is desirable to have a maximum downwardly inclination of the screen frame so as to cause the clay, which is extremely sticky, to be discharged as rapidly as possible before it can clog the screen.

In the past a vibratory screening machine has been known which had a limited degree of adjustment of the inclination of the screen frame. In this machine, a discharge spout was located at the end of the screening frame which was pivoted, and the other end could be raised and lowered. However, since the discharge spout was fixed, the adjustment of the inclination of the screen frame was very limited because as the screen frame was adjusted in inclination, the spacing varied between the discharge spout and the end of the screen frame onto which the liquid-solid mixture discharged, and thereby adversely affected the screening process.

Furthermore, in these prior types of screening machines, since the amount which the screening bed could be inclined was limited, the "gumbo" had a very long period of contact with the screen and thus tended to clog it, which required an attendant to continuously wash the screen with a high pressure spray of water during the passage of the "gumbo." Furthermore, in certain instances the screens had to be removed from the screening frame for cleaning because of the "gumbo," thereby rendering the screening process inefficient.

SUMMARY OF THE INVENTION

It is accordingly one object of the present invention to provide an improved vibratory screening machine in which the screen frame is adjustable over a relatively wide range of inclinations to thereby have optimum positions for various soils which are encountered during drilling.

Another important object of the present invention is to provide an improved vibratory screening machine in which a discharge spout for the liquid-solid mixture which is to be screened is adjustable so that the amount of free fall of the liquid-solid mixture onto the screen frame can be controlled for optimum screening. A related and more specific object of the present invention is to correlate the movement of the discharge spout with the tilt of the screen frame to thereby cause the amount of free fall of the liquid-solid mixture onto the screen to remain relatively constant at all inclined positions of the screen frame. Other objects and attendant advantages of the present invention will readily be perceived hereafter.

The present invention relates to a vibratory screening machine comprising a main frame, a screen frame, mounting means mounting said screen frame on said main frame, a screen on said screen frame, a source of a liquid-solid mixture, discharge means for discharging said liquid-solid mixture onto said screen, and adjusting means for adjusting the inclination of said screen relative to said main frame and for maintaining the position of said discharge means in substantially the same relative position to said screen in adjusted positions thereof.

The various aspects of the present invention will be more fully understood when the following portions of the specification are read in conjunction with the accompanying drawings wherein:

DESCRIPTION OF THE PREFERRED EMBODIMENTS

Figure 3:
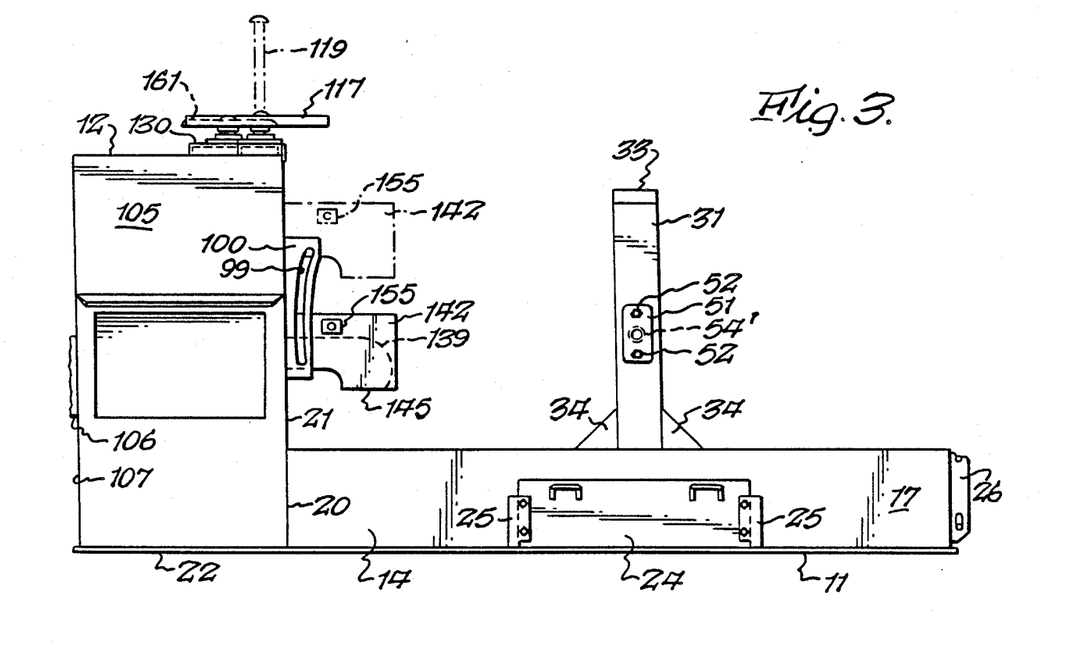
FIG. 3 is a side elevational view of the main frame of the machine including the weir attached thereto.

The vibratory screening machine 10 consists essentially of three basic parts, namely, a main frame 11 (FIG. 3), a weir 12, and a screen frame 13 (FIGS. 4 and 5) which is pivotally mounted on the main frame for selective movement to various tilted positions, depending on the composition of the liquid-solid slurry which is being supplied thereto from the weir.

The main frame 11 includes a trough 14 at its lower end for receiving material which passes through the screen of the screening frame 13. Trough 14 includes a bottom plate 15, a pair of side plates 17 extending upwardly therefrom, and an end plate 19 having pins 16 at the ends thereof which are received in slots 18 and 18' in plates 26 to mount plate 19 on the trough. The end of trough 14 opposite to end plate 19 is closed by the lower portion 20 (FIGS. 1 and 2) of wall 21 of weir 12. Bottom plate 15 also includes a portion 22 (FIG. 2) which forms the bottom plate of weir 12. An opening 23 is located in each side plate 17 and can be closed by a plate 24 (FIGS. 1, 2 and 3) which is slidably received in brackets 25 secured to the outsides of side walls 17. The flow of material from trough 14 can be from whichever opening 23 does not have its cover plate 24 mounted thereon. The flow from trough 14 is to a suitable tank (not shown) which receives the screened liquid containing drilling mud. Inclined plates 27 and 29 are located at the corners of trough 14 to reinforce the trough and also direct liquid toward openings 23.

A pair of channels 30 (FIGS. 6, 11 and 12) are welded to the upper portions of side walls 17. The lower ends of standards 31 are welded to the upper plates 32 of channels 30 and a cross brace member 33 has its opposite ends welded across the tops of standards 31. Gussets 34 (FIGS. 1 and 2) are welded between the lower portions of standards 31 and plates 32. Standards 31 and cross brace 33 are in the form of channels.

Figure 11:
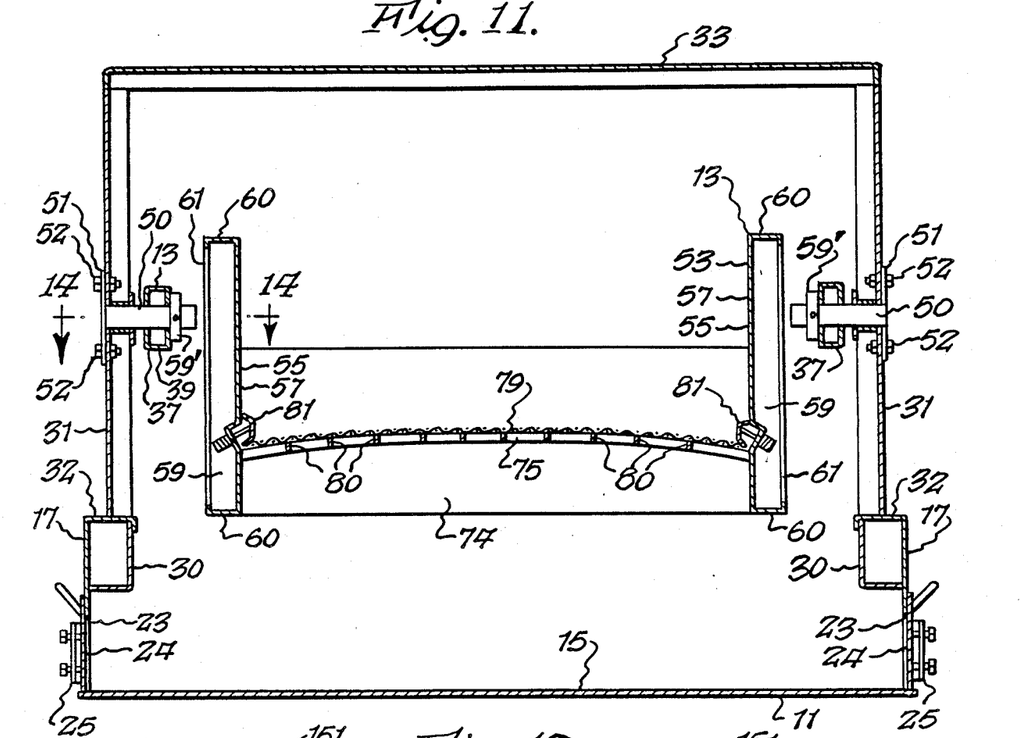
FIG. 11 is a cross sectional view taken substantially along line 11—11 of FIG. 1 and showing primarily the pivotal connections between the main frame and the outer portion of the screen frame.
Figure 12:
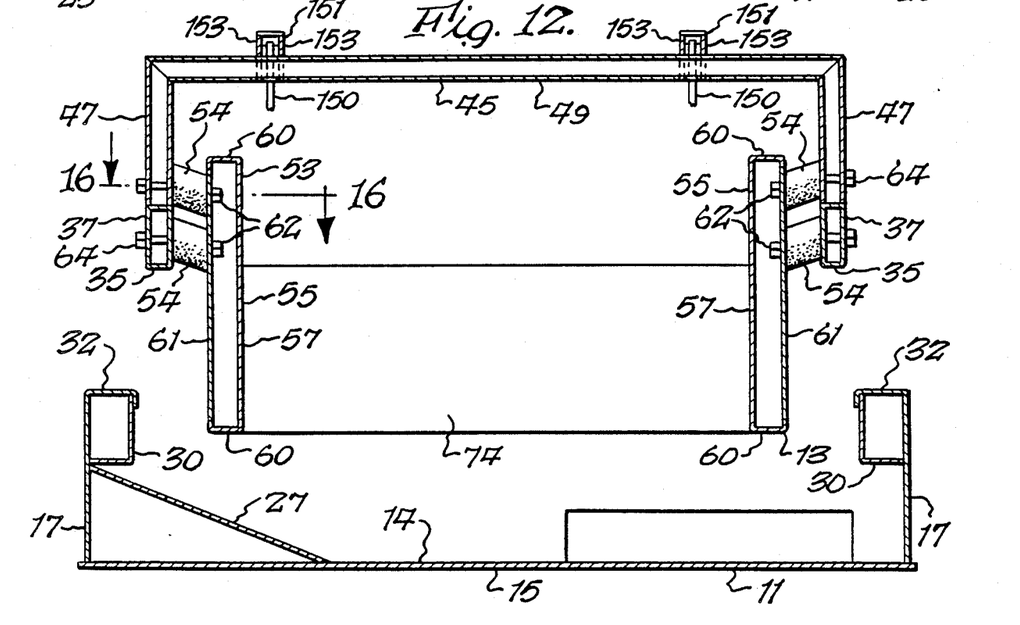
FIG. 12 is a cross sectional view taken substantially along line 12—12 of FIG. 1 and showing primarily the resilient connections between the outer and inner portions of the screen frame.

The screening frame 13 is pivotally mounted on standards 31. In this respect, screening frame 13 includes an outer frame portion 35 consisting of spaced substantially parallel box members 37 (FIG. 11). An inverted U-shaped frame member 39 (FIGS. 4 and 6) has the lower portions of its opposite legs 40 welded to frame members 37. A cross member 41 is welded to the upper ends of legs 40. A bracket 42 is welded to cross member 41 and it carries junction member 43 from which electrical leads 44 are connected to the vibratory motors. Another inverted U-shaped member 45 (FIGS. 1, 4 and 12) has the lower portions of its legs 47 (FIG. 12) welded to members 37, and a cross brace 49 is welded across the tops of legs 47, which are braced by members 48.

Figure 1:
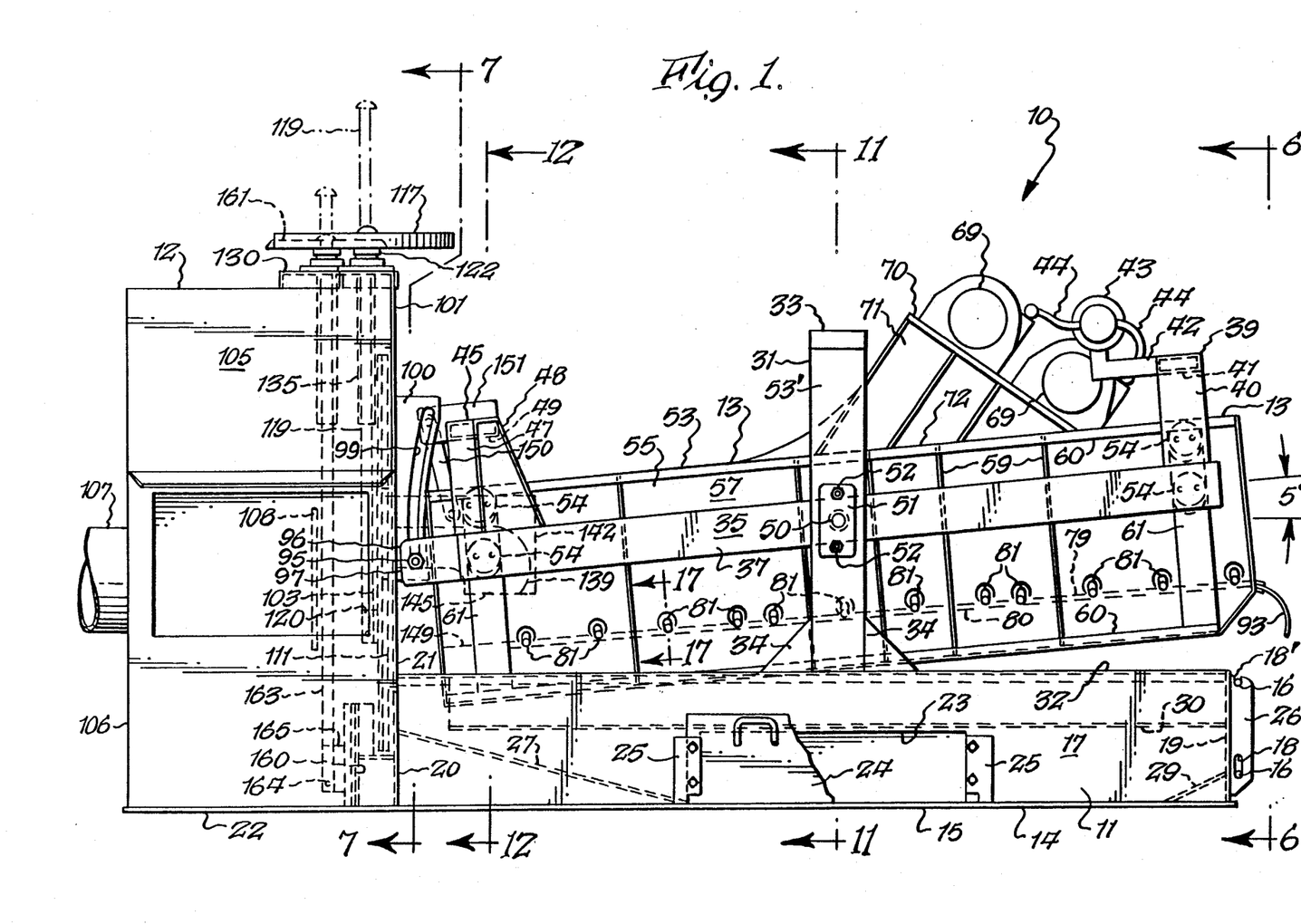
FIG. 1 is a side elevational view of the improved vibratory screening machine of the present invention with its screen frame in an upwardly tilted position.
Figures 13, 14, 15, 16, 17:
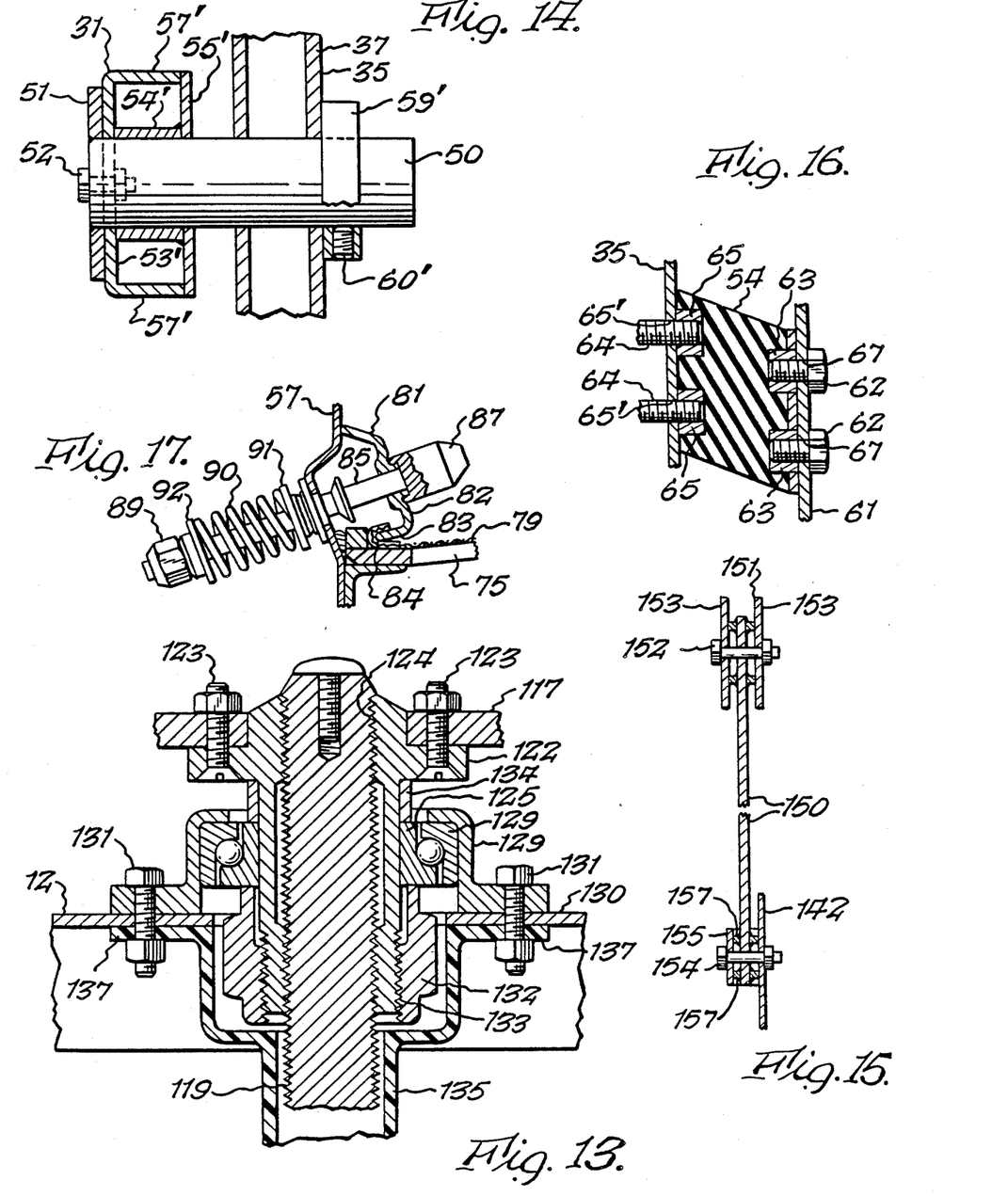
FIG. 13 is an enlarged fragmentary cross sectional view taken substantially along line 13—13 of FIG. 7 and showing the mechanism for raising and lowering the weir gate.
FIG. 14 is an enlarged fragmentary cross sectional view taken substantially along line 14—14 of FIG. 11 and showing the pivotal connection between the main frame and the outer portion of the screen frame.
FIG. 15 is a fragmentary cross sectional view taken substantially along line 15—15 of FIG. 2 and showing the locking connection between the main frame and the outer portion of the screen frame.
FIG. 16 is a fragmentary cross sectional view taken substantially along line 16—16 of FIG. 12 and showing the structure of the resilient mountings between the outer and inner portions of the screen frame.
FIG. 17 is a fragmentary cross sectional view taken substantially along line 17—17 of FIG. 1 and showing the means for conecting the screen to the inner portion of the screen frame.

Outer screen frame portion 35 is pivotally mounted on standards 31 by shafts 50 (FIGS. 1, 11 and 14). More specifically, one end of each shaft 50 is welded to a plate 51 which is secured by bolts 52 to side 53' of standard 31. A tube 54' is welded to plate 55' which is welded to legs 57' of standard 31. Tube 54' supports the end of shaft 50. A collar 59' is secured to shaft 50 by set screw 60'. A mirror-image construction is associated with the other side frame member 37 for securing it to the other standard 31. Side frame members 37 can pivot on shafts 50 during adjustment of the inclination of the screen frame 13, as set forth in greater detail hereafter.

An inner screen frame portion 53 (FIGS. 1, 2, 5 and 6) is resiliently mounted on outer screen frame portion 35 by means of resilient mounts 54 (FIGS. 12 and 16) which are secured between outer screen frame portion 35 and the sides 55 of inner screen frame portion 53. More specifically, sides 55 include walls 57 (which are in the form of plates which are rigidized by bracing strips 59 welded thereto along their longitudinal edges which contact walls 57 and which have their upper ends located within transverse channel-shaped portions 60 at the lower and upper edges of sides 55 (FIG. 11). Plates 61 (FIGS. 5 and 12) are suitably welded to the outsides of walls 57 ad screws 62 (FIG. 16) extend through plates 61 and are received in tapped metal sockets 63 which are suitably secured to resilient mounts 54. Other screws 64 extend through holes, such as 65' (FIG. 4), in outer screen frame member 35 and are received in tapped metal sockets 65 which are embedded in resilient mounts 54. As can be seen from the holes 67 in plates 61 (FIG. 5) of inner screen frame portion 53 and from the holes 65' in outer screen frame portion 37 (FIG. 4), and as can be seen from FIG. 12, there are two resilient mounts at each end of each side wall 55 to thereby resiliently support inner screen frame portion 53 on outer screen frame portion 35.

The inner screen frame portion 53 is vibrated by vibratory motors 69 which are mounted on a plate 70 which has its opposite ends welded to plates 71 which in turn have their lower edges welded to the upper sides 72 of side frame members 55. The leads 44 extend between junction member 43 and motors 69, and a suitable electric power lead is coupled to member 43.

Figure 2:
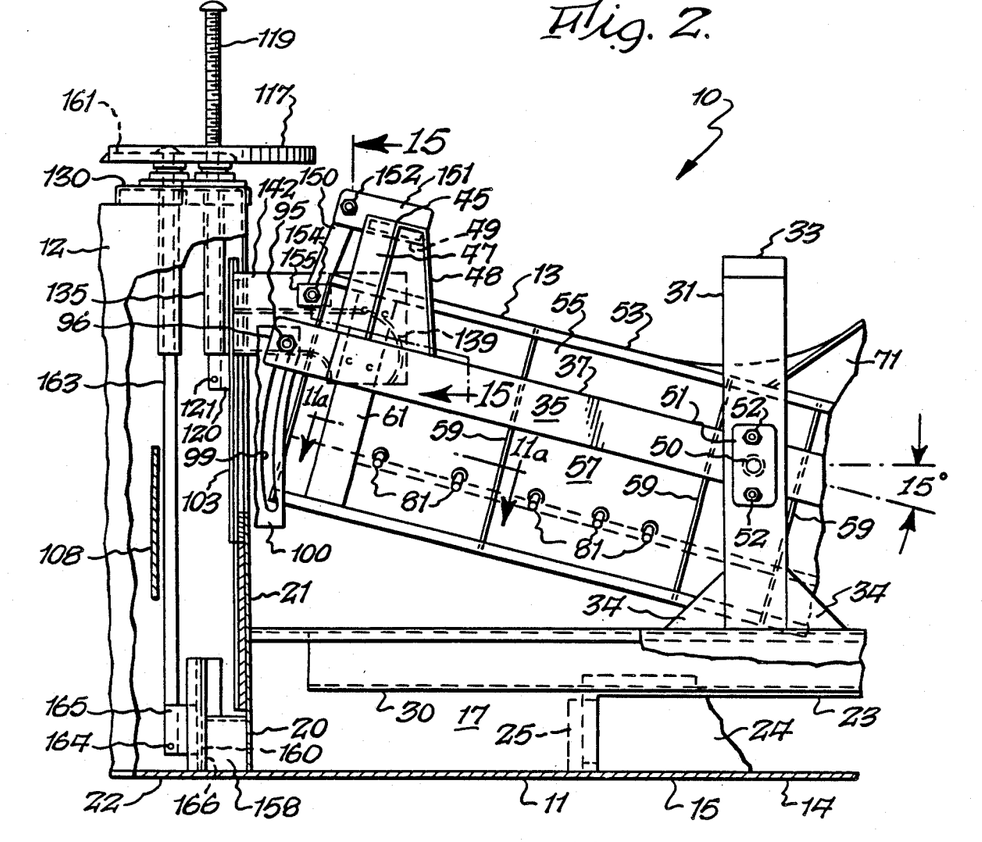
FIG. 2 is a fragmentary side elevational view, partially broken away, of the left portion of FIG. 1 and showing the screen frame in a downwardly tilted position.
Figure 6:
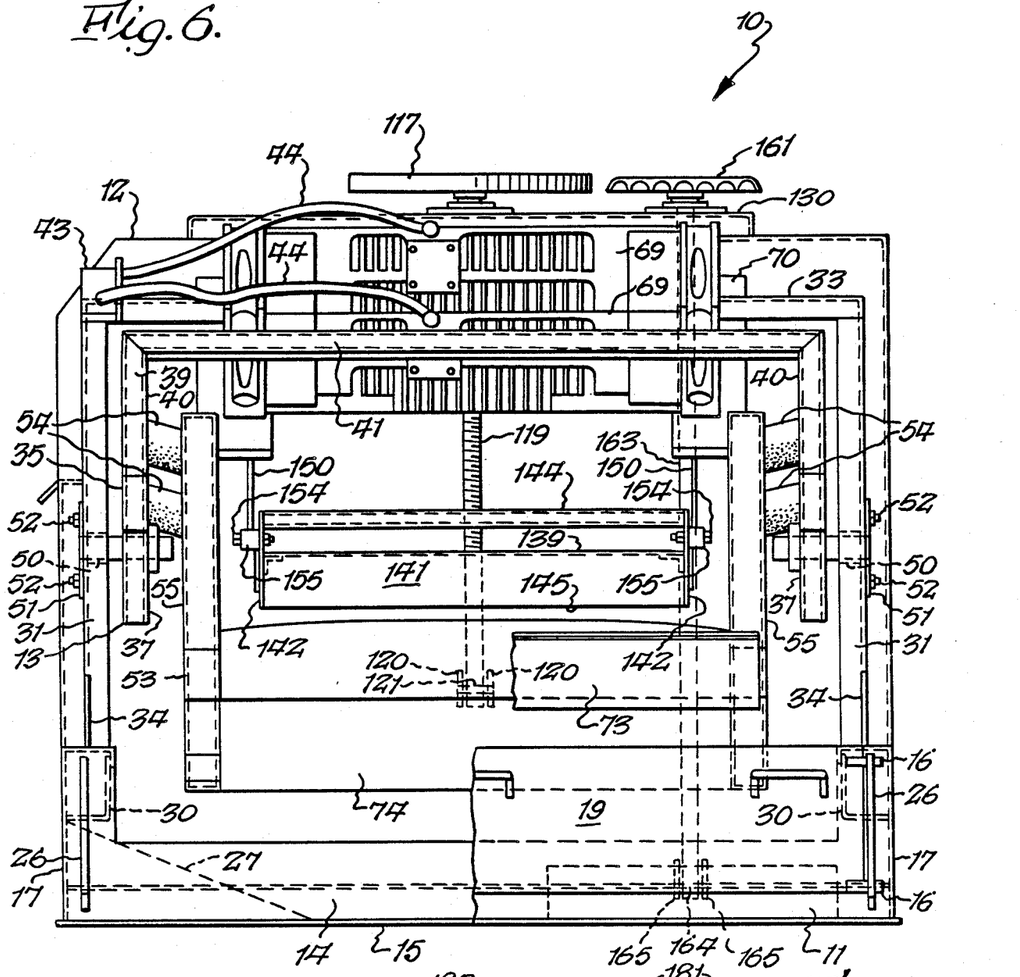
FIG. 6 is a fragmentary end elevational view taken substantially in the direction of arrows 6—6 of FIG. 1.
Figure 11A:
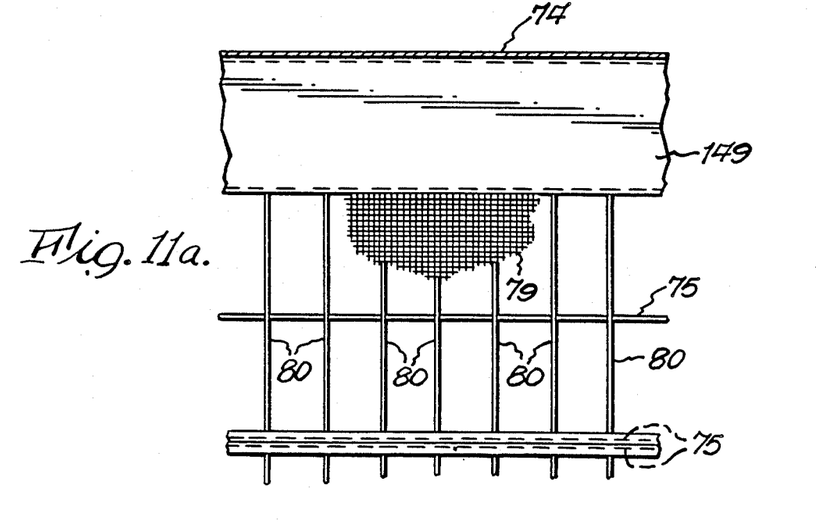
FIG. 11a is a fragmentary sectional view taken substantially along line 11a—11a of FIG. 2 and showing the surface onto which the liquid-solid mixture is discharged.

The extreme right end of the side walls 57 of FIG. 1 are welded to the opposite ends of plate 73 (FIG. 6). The extreme left ends of walls 55 of FIG. 1 are welded to the opposite ends of plate 74 (FIG. 11). A plurality of ribs 75 (FIG. 11) are welded at their opposite ends to walls 57. There are a plurality of substantially parallel ribs 75 located transversely to walls 57 along the entire length of the latter. A plurality of longitudinally extending rods 80 (FIGS. 11 and 11a) extend between each pair of adjacent arcuate ribs 75. A plurality of flexible screens 79 are secured between opposite side walls 57 by brackets 81 (FIGS. 1, 2 and 17). These brackets are conventional. More specifically, each bracket 81 includes a member 82 having an end 83 which bears on the U-shaped edge 84 of screen 79. A shaft 85 has a head 87 which bears on member 82. The end of shaft 85 is threaded and carries a nut 89. A spring 90 is interposed between washer 91 and washer 92. The force which member 82 exerts on screen 79 will depend on the amount that nut 89 is tightened. There are a plurality of brackets 81 associated with each edge of each screen, as is well known in the art, to cause each screen to lie securely across the tops of ribs 75.

The slurry, or liquid-solid mixture containing drilling mud, is supplied to inner vibratory screen frame 53 from weir 12, and it flows across the screens 79. The drilling mud and liquid pass through the screens and are received in trough 14 from which they flow to tanks after passing through one or both openings 23. The trailings, or material to be discarded, passes over guide 93 at the end of inner screen frame portion 53 and is discarded.

In accordance with the present invention, the screen frame 13 is tiltable between the extreme positions shown in FIG. 1 and FIG. 2. More specifically, as explained above, when clay, which is known as "gumbo" is encountered during the drilling, the screen frame 13 is inclined downwardly at an angle of 15° so that it will pass rapidly over the screen and be discarded, thereby minimizing its clogging effect. However, during normal screening operations, the screen frame 13 is preferably inclined at a −5° angle (FIG. 1) so that there will be a reasonably long period of contact as the slurry passes from left to right in FIG. 1 so that a maximum amount of the drilling mud will be recovered by passing through screens 79. Also, as conditions change, the screen frame 13 may be inclined at any desired adjusted position between the extreme limits of 15° (FIG. 2) and −5° (FIG. 1).

It is imperative that the flow from weir 12 should always be deposited directly onto the left end of the inner screen frame 53, that is, it should always only have a predetermined amount of free fall from the weir onto the bed containing the screens in all inclined positions of the screen frame. To this end structure is provided for correlating the movement of the discharge spout of the weir gate with the movement of the left end of the screen frame so that the amount of drop of the liquid-solid mixture onto the screen frame will always remain substantially constant.

The inclination of the screen frame 13 is effected by pivoting it about shafts 50 described above. In order to pivot screen frame 13, bolts 95 (FIGS. 1 and 7) are loosened. These bolts extend between spaced flexible ends 97 of U-shaped members 96 welded to the ends of outer screen frame members 37, and the central portions of bolts 95 are located in slots 99 (FIGS. 1, 2 and 3) of plates 100. One plate 100 is welded to plate 101 secured to weir 12 and the other plate 100 is secured to plate 102 which is also secured to weir 12. It can thus be seen that by loosening bolts 95, the outer screen frame portion 35 can be pivoted about shafts 50, and when the desired inclination of the screen frame has been obtained, the bolts 95 are retightened to force flexible sides 97 against plates 100 to hold the screen frame in its adjusted position.

The screen frame 13 is adjusted to its desired inclined position by raising and lowering the weir gate after bolts 95 have been loosened. In this respect, the weir gate 103 is mounted for vertical sliding movement in wall 21 of the weir which, in addition to having a bottom wall 22, also has a pair of side walls 104 and 105 and a rear wall 106 into which the slurry is fed through conduit 107 and impinges onto baffle 108. One edge of weir gate 103 (FIG. 9) has a plate 109 welded thereto which has an inclined surface 110. An elongated plate 111 (FIGS. 7 and 9) is secured to one edge portion of weir wall 21 by means of a plurality of screws 112 with a spacer plate 113 and a gasket 114 therebetween. Plate 111 has an inclined surface 115 which mates with inclined surface 110. The opposite vertical edge of weir gate 103 is mounted on wall 21 by mirror-image structure.

In order to raise and lower weir gate 103, a hand wheel 117 is journalled on the weir wall and is effectively coupled to threaded shaft 119 (FIGS. 1, 6 and 13) which does not rotate. The lower end of threaded shaft 119 is pinned between plates 120 welded to weir gate 103 by pin 121 (FIGS. 2, 6, 7 and 8). Hand wheel 117 is bolted to tubular member 122 by bolts 123 (FIG. 13). Member 122 is internally threaded at 124 for mating threaded engagement with threaded shaft 119. An inner race 125 of ball bearing is fixedly secured to member 122, and the outer race 127 is secured by bracket 129 to the top plate 130 of weir 12 by bolts 131. The inner race 125 is secured onto tubular member 122 by means of threaded sleeve 132 which bears against the underside of inner race 125 when collar 132 is threaded onto the threads 133 of member 122 to thereby wedge inner race 125 against sleeve 134. A tubular member 135, which shields threaded shaft 119, has a flange 137 which is secured to the underside of plate 130 of weir 12 by bolts 131, as shown. Thus, whenever hand wheel 117 is turned, the threaded shaft 119 will move axially in a vertical direction, and by virtue of its connection with weir gate 103, it will move the latter vertically.

Figure 7:
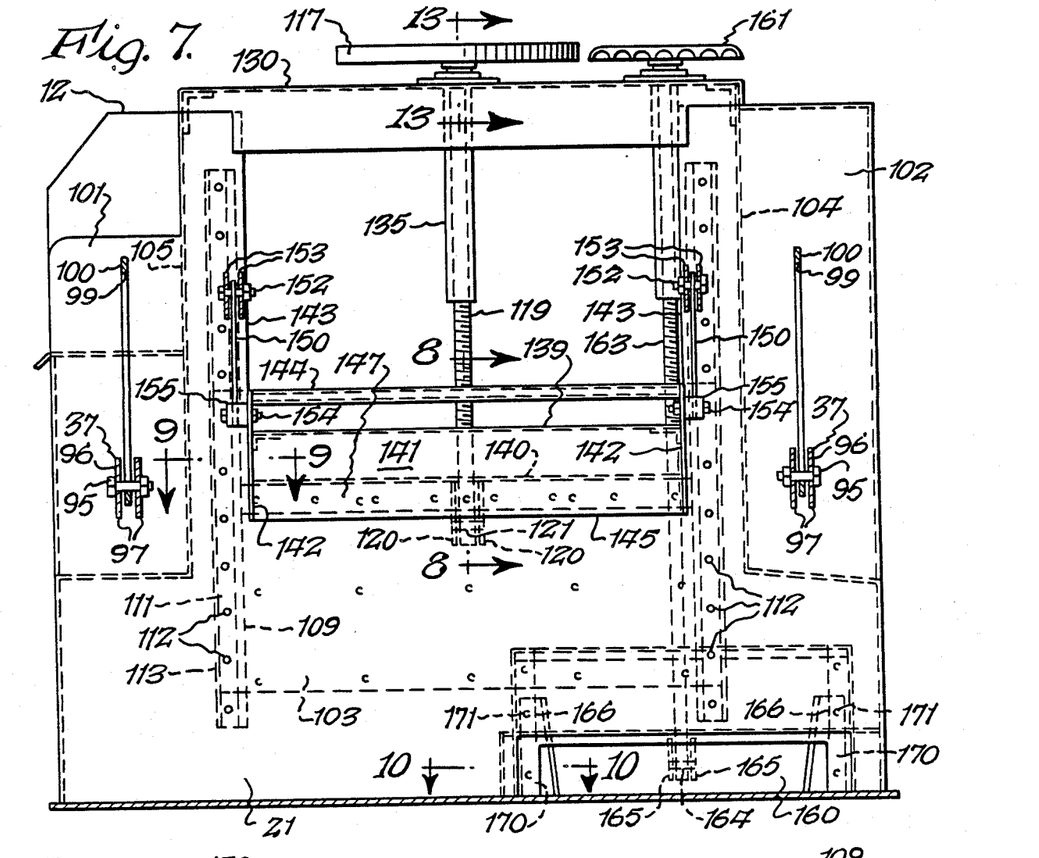
FIG. 7 is a cross sectional view taken substantially along line 7—7 of FIG. 1 and showing details of the weir and portions of the main frame adjacent thereto.
Figures 8, 9, 10:
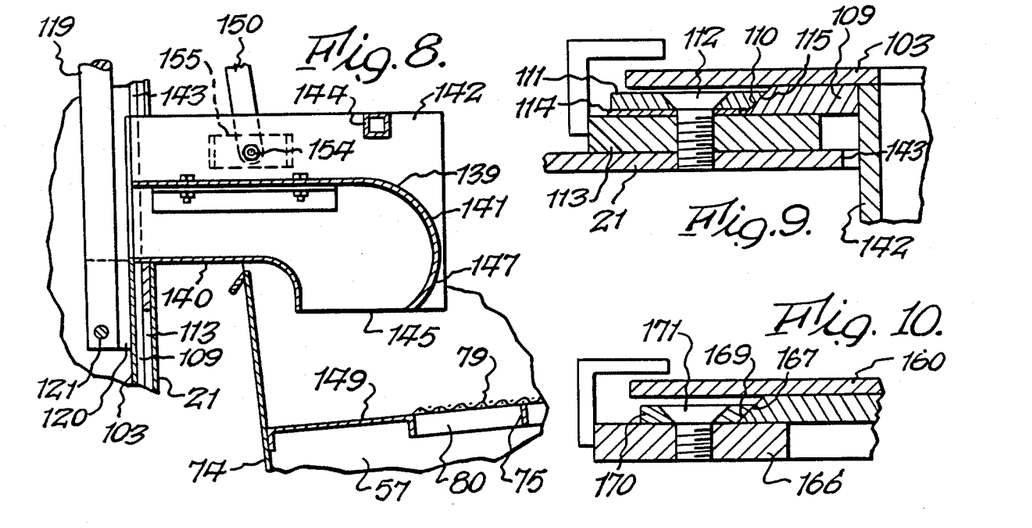
FIG. 8 is a cross sectional view taken substantially along line 8—8 of FIG. 7 and showing primarily the discharge spout of the weir and related structure.
FIG. 9 is a cross sectional view taken substantially along line 9—9 of FIG. 7 and showing the slidable sealing connection between the weir gate and the weir wall.
FIG. 10 is a fragmentary cross sectional view taken substantially along line 10—10 of FIG. 7 and showing the slidable sealing connection between the bypass gate and the wall of the weir.

A discharge spout 139 (FIGS. 1, 2 and 8) has a lower side 140 and an upper side 141, both of which extend between plates 142 (FIG. 7) which are located proximate edges 143 of the opening in weir wall 21. A brace 144 (FIG. 8) extends between plates 142. The outlet portion of discharge spout 139 is at 145 (FIG. 8) at the very bottom edges of plates 140 and 141. The portion 147 of plate 141 is curved as shown in FIG. 8 to direct the flow of slurry directly downwardly onto plate 149 (FIGS. 8 and 11a) at the end of the screen frame.

A linkage is provided between plates 142 and the outer portion 35 of screen frame 13 so that the latter will follow the position of weir gate 103 as it is raised and lowered and thus the discharge opening 145 of discharge spout 139 will always be substantially the same distance above the plate 149 of screen frame 13 onto which it discharges its slurry in all adjusted positions of the screen frame 13. More specifically, links 150 (FIGS. 1, 2, 7, 8 and 15) are effectively located between plates 142 and outer screen frame portion 35. In this respect, a pair of spaced brackets 151 (FIGS. 1, 2 and 12) have their undersides welded to the top of cross bar 49. Bolts 152 extend between spaced sides 153 of brackets 151 and bores in the upper ends of links 150. Bolts 154 extend between plates 142 and plates 155 which are spacedly mounted relative to plates 142 by spacers 157

(FIG. 15). The lower ends of links 150 are pivotally mounted on bolts 154. Thus, as the weir gate 103 is moved vertically by the manipulation of hand wheel 117, the inclination of screen frame 13 can be adjusted to any desired position between that shown in FIG. 1 and that shown in FIG. 2. It is to be especially noted that in all adjusted positions of screen frame 13, the outlet 145 of discharge spout 139 is always at substantially the same elevation above plate 149 (FIG. 8) onto which the liquid-solid mixture impinges prior to traveling onto screens 79 of the inner screen frame. In this respect it will be appreciated that if the foregoing optimum substantially constant relationship was not maintained, flow would be restricted if the screen frame was too close to the discharge outlet 145 and, conversely, the flow would be uncontrolled and turbulent if it was too far distant from the screen frame. In other words, the flow has to be laid onto plate 149 from which it flows substantially evenly across the screens on the screen frame.

A bypass door 160 (FIGS. 2 and 7) is located at the end of duct 158 at the bottom of plate 21 of weir 12. This door is opened and closed, as needed, to permit flow to pass directly from weir 12 into trough 14, thereby bypassing the screening frame 13. The mechanism for raising and lowering bypass door 160 is the same as for raising and lowering weir gate 103. Broadly, it includes a hand wheel 161 (FIGS. 2 and 7) which is mounted onto the identical type of structure shown in FIG. 13 to rotate a tubular member such as 122 (FIG. 13) which in turn raises and lowers threaded shaft 163 which has its lower end pinned by pin 164 to spaced plates 165 extending outwardly from the rear of bypass door 160. Bypass door 160 is guided for rectilinear sliding movement on wall 166 of duct 158 by the coaction between the facing inclined surfaces 167 and 169 (FIG. 10). Surface 169 is on a part of door 160 and surface 167 is on a strip 170 which is secured to duct wall 166 by screws 171. It will be understood that there are two mirror-image members 170 at opposite edges of the door. Furthermore, as can be seen from FIG. 7, door 160 has downwardly tapered sides in complementary mating engagement with the sides of members 170, to thereby provide a good solid wedged closed position of the bypass door.

Figure 4:
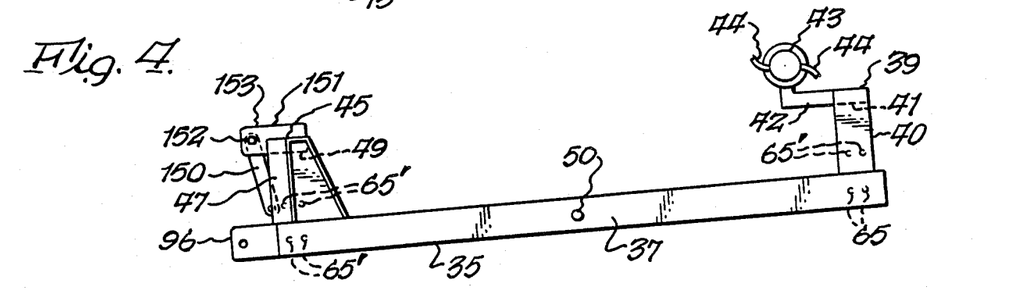
FIG. 4 is a side elevational view of the outer portion of the screen frame which is mounted on the main frame.
Figure 5:
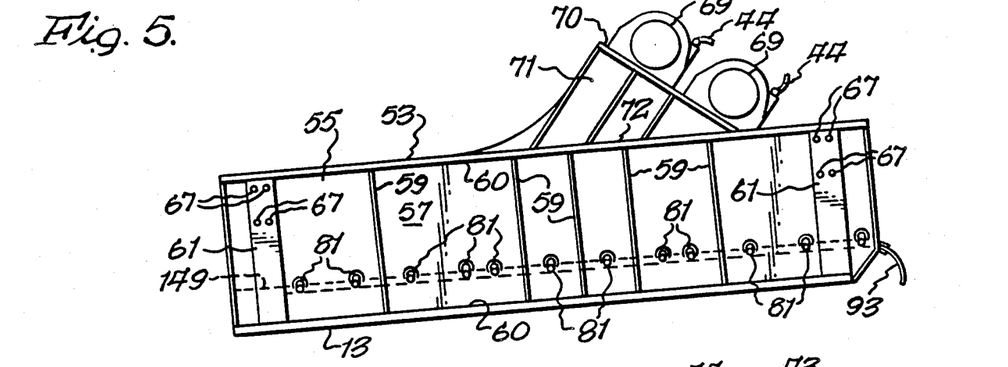
FIG. 5 is a side elevational view of the inner portion of the screen frame which is mounted on the outer portion of the screen frame of FIG. 4.
Figures 18, 19, 20:
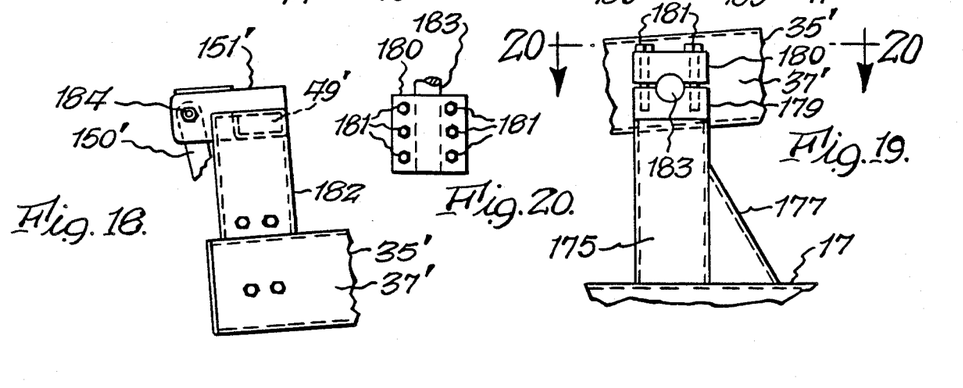
FIG. 18 is a fragmentary side elevational view of an alternate structure at the left end of the outer portion of the screen frame.
FIG. 19 is a fragmentary side elevational view of an alternate construction for pivotally mounting the outer portion of the screen frame on the main frame.
FIG. 20 is a fragmentary plan view taken substantially along line 20—20 of FIG. 19.

In FIGS. 18–20 alternate constructions are shown for mounting and moving the outer portion of the screen frame. More specifically, in FIG. 19 tubular column 175, which is analogous to column 31 of FIG. 3, has its lowermost portion welded to side plate 17. A gusset 177 is suitably welded therebetween. The lower half 179 of a pillow block is welded to the top of column 175 and the upper half 180 of the pillow block is bolted to the lower portion by a plurality of bolts 181, in this instance, three bolts on each side of the shaft 183, which is firmly and non-rotatably held within the pillow block. Shaft 183 is analogous to shaft 50 (FIG. 14). The end of shaft 183 pivotally supports frame member 37', which is identical to frame member 37 of the preceding figures. The shaft 183 extends through frame member 37' and is secured therein by a collar, such as 59' (FIG. 14), and set screw 60'. A mirror-image arrangement of FIG. 19 is located on the opposite side of the machine. Thus, outer frame portion 35', which is analogous to outer frame 35 of FIG. 4 is supported by a pair of shafts, such as 183, which are secured in pillow block halves, such as 179, 180, mounted on spaced columns 175.

In FIG. 18 an alternate construction is shown for the left end of the outer portion 35' of the screen frame. A tubular member 182 has its lower end welded to frame member 37' and a tubular member 49' which is analogous to member 49 of FIG. 1 has its oppposite ends welded to tubular member 182 and its counterpart on the opposite side of the frame. Two pairs of brackets, such as 151' which may be identical to brackets 151 of the preceding figures, are welded to cross member 49'. Links 150', which may be identical to links 150 of FIG. 1, have their upper ends pivotally mounted at 184 to each pair of spaced brackets 151' in the same manner as described above relative to FIG. 7. The lower ends of links 150' are pivotally secured to the discharge spout 139 in the same manner as described above relative to links 150, and as shown in FIGS. 7 and 8.

The embodiment of FIGS. 18–20 does not require the structure such as plates 100 with slots 99, bolts 95 and bifurcated ends 96 as described above relative to FIG. 1. In the embodiment of FIGS. 18 and 19, the threaded connection between shaft 119 and tubular member 135 is adequate to retain the discharge spout and the screen frame in its adjusted position.

While conduit 107 has been shown at the elevation of FIG. 1, preferably it is located at a lower elevation. Furthermore, an inlet conduit, such as 107, can be placed in side wall 104 or 105 if the inlet feed is desired to be in these locations.

While a specific construction has been disclosed for raising and lowering the weir gate, it will be appreciated that other mechanical structures can be used to effect the same ultimate result, and that such structures are within the scope of the present invention. It will also be appreciated that while the discharge spout and the outer portion of the screen frame are adjusted simultaneously by their interconnecting linkage, it will be appreciated that it is within the scope of the present invention to adjust the elevation of the discharge spout and the inclination of the screen separately to maintain the same relative positions therebetween. For example, the inclination of the screen frame could be adjusted by an arangement such as shown in FIGS. 1 and 7 wherein pins 95 slide in slots 99 of plate 100, and the discharge spout could be adjusted by the structure which is shown, and the links, such as 150, could be eliminated. Furthermore, it is quite obivous that other structures could be used to adjust the positions of the discharge spout and the inclination of the screen frame.

It can thus be seen that the improved vibratory screening machine of the present invention is manifestly capable of achieving the above-enumerated objects, and while preferred embodiments of the present invention have been disclosed, it will be appreciated that it is not limited thereto but may be otherwise embodied within the scope of the following claims.

What is claimed is:

1. A vibratory screening machine comprising a main frame, a screen frame, mounting means mounting said screen frame on said main frame, a screen on said screen frame, means for vibrating said screen frame, a weir fixedly mounted directly on said main frame for containing a liquid-solid mixture, discharge means on said weir for discharging said liquid-solid mixture onto said screen, and adjusting means for adjusting the inclination of said screen relative to said main frame and for adjusting the elevation of said discharge means relative to said weir to thereby maintain the position of said discharge means in substantially the same relative position to said screen in adjusted positions thereof.

2. A vibratory screening machine as set forth in claim 1 wherein said mounting means comprise means for permitting pivotal movement between said main frame and said screen frame.

3. A vibratory screening machine as set forth in claim 2 wherein said means for permitting pivotal movement comprises a pivotal connection located substantially at the horizontal midpoint of said screen frame.

4. A vibratory screening machine as set forth in claim 3 wherein said pivotal connection comprises a pair of spaced standards on said main frame, a pair of spaced frame members on said screen frame with each of said frame members being located adjacent one of said standards, and shaft means extending between each of said adjacent frame members and standards.

5. A vibratory screening machine as set forth in claim 1 wherein said adjusting means include link means for effectively interconnecting said discharge means to said screen.

6. A vibratory screening machine as set forth in claim 1 wherein said mounting means mounting said screen frame on said main frame comprise a pivotal connection therebetween which is located at a sufficiently central portion thereof to enable said screen to be inclined both upwardly and downwardly relative to said discharge means.

7. A vibratory screening machine comprising a main frame, a screen frame, mounting means mounting said screen frame on said main frame, a screen on said screen frame, means for vibrating said screen frame, a source of a liquid-solid mixture mounted directly on said main frame, discharge means mounted on said source of liquid-solid mixture including a portion closest to said screen locatable at a predetermined elevation above said screen for discharging said liquid-solid mixture onto said screen, first adjusting means for adjusting the inclination of said screen frame relative to said main frame, and second adjusting means for adjusting the elevation of said discharge means including said portion closest to said screen relative to said source of liquid-solid mixture for maintaining the position of said portion closest to said screen in substantially the same relative position to said screen frame in adjusted positions of said screen frame.

8. A vibratory screening machine as set forth in claim 7 wherein said second adjusting means comprise means for raising and lowering said discharge means, and wherein said first adjusting means comprise link means effectively connecting said discharge means to said screen frame whereby said elevation of said discharge means and said inclination of said screen frame are adjusted simultaneously.

9. A vibratory screening machine comprising a main frame, a screen frame, first mounting means mounting said screen frame on said main frame, a screen, second mounting means for mounting said screen on said screen frame, means for vibrating said screen frame, a source of a liquid-solid mixture, mounted directly on said main frame, discharge means for discharging said liquid-solid mixture onto said screen, adjusting means for adjusting the inclination of said screen relative to said main frame and for maintaining the position of said discharge means in substantially the same relative position to said screen in adjusted positions thereof, said first mounting means comprising means for permitting pivotal movement between said main frame and said screen frame, said discharge means comprising a weir, said means for maintaining said discharge means in substantially the same relative position to said screen comprising link means for effectively interconnecting said discharge means to said screen, and said weir including a weir gate for regulating the height at which said liquid flows from said weir.

10. A vibratory screening machine as set forth in claim 9 wherein said weir includes a side wall, and means for mounting said weir gate for sliding movement in said side wall, and wherein said discharge means includes a discharge spout mounted on said weir gate for directing said liquid downwardly onto said screen.

11. A vibratory screening machine comprising a main frame, a screen frame, first mounting means mounting said screen frame on said main frame, a screen, second mounting means for mounting said screen on said screen frame, means for vibrating said screen frame, a source of a liquid-solid mixture, mounted directly on said main frame, discharge means for discharging said liquid-solid mixture onto said screen, adjusting means for adjusting the inclination of said screen relative to said main frame and for maintaining the position of said discharge means in substantially the same relative position to said screen in adjusted positions thereof, said first mounting means comprising means for permitting pivotal movement between said main frame and said screen frame, said discharge means comprising a weir, said means for maintaining said discharge means in substantially the same relative position to said screen comprising link means for effectively interconnecting said discharge means to said screen, means for locking said discharge means in adjusted positions thereof comprising pin and slot means effectively interposed between said main frame and said screen frame, and locking means for locking said pin and slot means in said adjusted positions.

12. A vibratory screening machine as set forth in claim 11 wherein said pin and slot means comprises a plate fixed relative to said main frame, a slot in said plate, a pin secured to said screen frame and extending through said slot, and wherein said locking means comprises means for securing said pin relative to said plate.

13. A vibratory screening machine comprising a main frame, a screen frame, first mounting means mounting said screen frame on said main frame, a screen, second mounting means for mounting said screen on said screen frame, means for vibrating said screen frame, a source of a liquid-solid mixture, mounted directly on said main frame, discharge means for discharging said liquid-solid mixture onto said screen, adjusting means for adjusting the inclination of said screen relative to said main frame and for maintaining the position of said discharge means in substantially the same relative position to said screen in adjusted positions thereof, said first mounting means comprising means for permitting pivotal movement between said main frame and said screen frame, said discharge means comprising a weir, said means for maintaining said discharge means in substantially the same relative position to said screen comprising link means for effectively interconnecting said discharge means to said screen, said weir including a weir gate, said link means comprising elongated link means having opposite ends, and pivotal connections at opposite ends of said elongated link means for effectively connecting said weir gate to said screen.

14. A vibratory screening machine as set forth in claim 13 wherein said elongated link means comprise a pair of substantially parallel elongated links extending between opposite side portions of said screen frame and opposite side portions of said weir gate.

15. A vibratory screening machine comprising a main frame, a screen frame, first mounting means mounting said screen frame on said main frame, a screen, second mounting means for mounting said screen on said screen frame, means for vibrating said screen frame, a source of a liquid-solid mixture, mounted directly on said main frame discharge means for discharging said liquid-solid mixture onto said screen, adjusting means for adjusting the inclination of said screen relative to said main frame and for maintaining the position of said discharge means in substantially the same relative position to said screen in adjusted positions thereof, said first mounting means comprising means for permitting pivotal movement between said main frame and said screen frame, said adjusting means comprising first means for raising and lowering said discharge means, and second means effectively coupling said discharge means to said screen.

16. A vibratory screening machine as set forth in claim 15 wherein said first means comprise an externally threaded shaft secured to said discharge means, an internally threaded sleeve mounted on said threaded shaft, means securing said threaded sleeve against axial movement on said source of liquid-solid mixture, and means for rotating said threaded sleeve to thereby effect axial movement of said threaded shaft.

17. A vibratory screening machine comprising a main frame, a screen frame, mounting means mounting said screen frame on said main frame, a screen on said screen frame, means for vibrating said screen frame, a source of a liquid-solid mixture mounted directly on said main frame, discharge means on said source of liquid-solid mixture including a portion closest to said screen located above said screen for discharging said liquid-solid mixture onto said screen, first adjusting means for adjusting the inclination of said screen frame relative to said main frame, and second adjusting means for adjusting the elevation of said discharge means including said portion closest to said screen relative to said source of liquid-solid mixture to cause it to be in desired positions relative to said screen frame in various adjusted positioned of said screen frame.

18. A vibratory screening machine comprising a main frame, a screen frame, first means mounting said screen frame on said main frame, a screen, second means mounting said screen on said screen frame, means for vibrating said screen frame, a weir for providing a source of liquid-solid mixture, means mounting said weir on said main frame, discharge means on said weir for discharging said liquid-solid mixture onto said screen, and single means for simultaneously adjusting the elevation of said discharge means relative to said weir and the inclination of said screen frame relative to said main frame.

19. A vibratory screening machine as set forth in claim 18 wherein said last-mentioned means include linkage means coupling said discharge means and said screen frame.

20. A vibratory screening machine comprising a main frame, a screen frame, first mounting means mounting said screen frame on said main frame, a screen, second mounting means for mounting said screen on said screen frame, means for vibrating said screen frame, a weir for providing a liquid-solid mixture, third mounting means mounting said weir on said main frame independently of said first and second mounting means, discharge means on said weir for discharging said liquid-solid mixture from said weir onto said screen, said discharge means including a portion closest to said screen from which said liquid-solid mixture is discharged, first adjusting means for adjusting the inclination of said screen frame on said main frame, and second adjusting means for adjusting the elevation of said discharge means relative to said weir including said portion closest to said screen from which said liquid-solid mixture is discharged.

21. A vibratory screening machine as set forth in claim 20 wherein said first means comprises a pivotal connection between said screen frame and said main frame, and wherein said pivotal connection is located at a sufficiently central portion of said screen frame to enable said screen to be inclined both upwardly and downwardly relative to said discharge means.

22. A vibratory screening machine comprising a main frame, a screen frame, first mounting means mounting said screen frame on said main frame, a screen, second mounting means for mounting said screen on said screen frame, means for vibrating said screen frame, a weir for providing a liquid-solid mixture, third mounting means mounting said weir on said main frame, discharge means on said weir for discharging said liquid-solid mixture from said weir onto said screen, and adjusting means for adjusting the inclination of said screen frame on said main frame and adjusting the elevation of said discharge means relative to said weir, said first mounting means including means between said screen frame and said main frame for enabling said screen to be inclined both upwardly and downwardly relative to said discharge means.

23. A vibratory screening machine as set forth in claim 22 wherein said last-mentioned means comprise a pivotal connection located at a central portion of said screen frame.

* * * * *